July 20, 1954  J. H. GOSS ET AL  2,683,921
METHOD OF MAKING AND MAGNETIZING ENCASED PERMANENT MAGNETS
Original Filed March 30, 1948 2 Sheets-Sheet 1
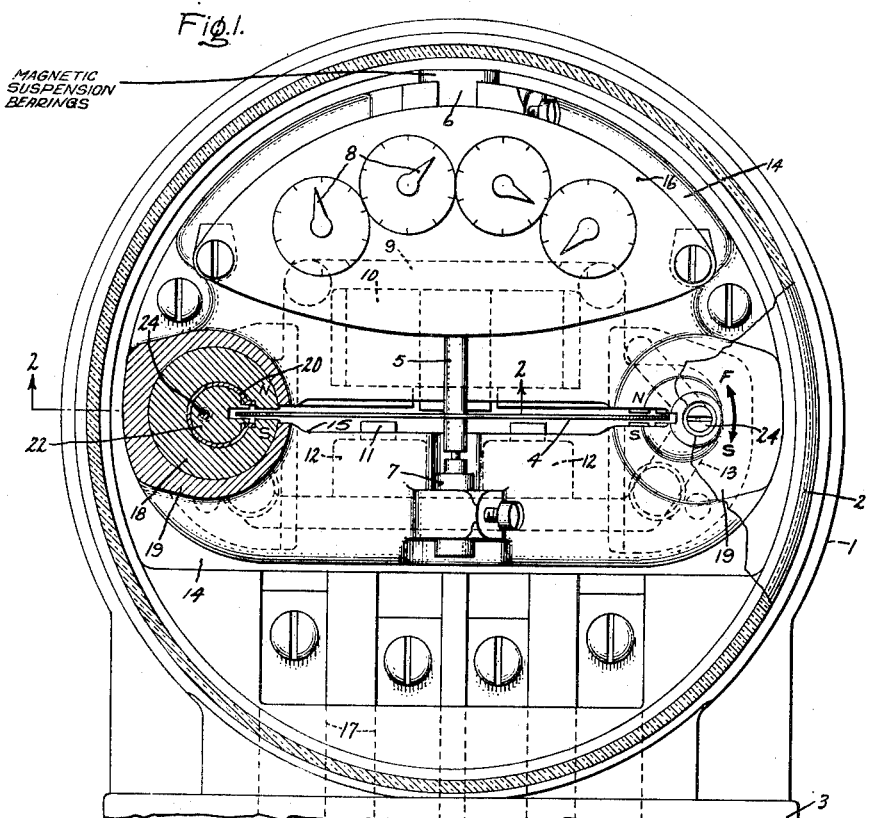
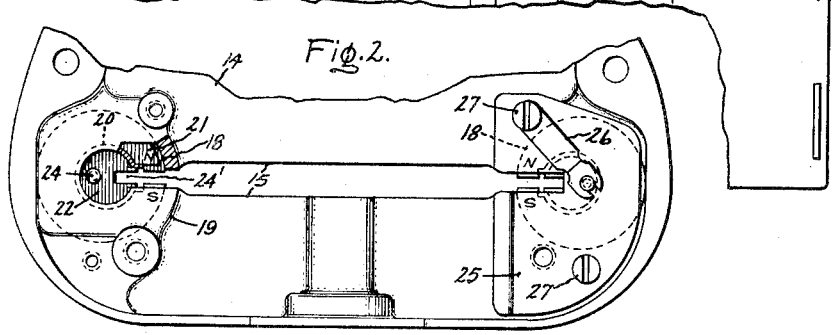
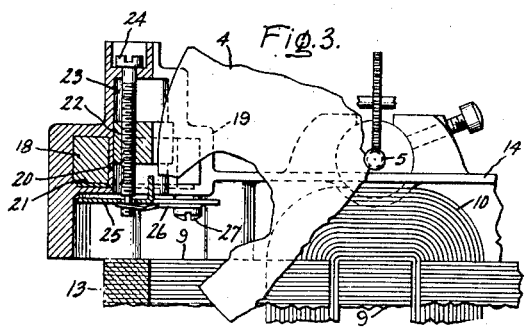
Inventors:
James H. Goss,
Lewis I. Mendelsohn,
Hans A. Bakke,
by Crowell S. Mack
Their Attorney.

July 20, 1954     J. H. GOSS ET AL     2,683,921
METHOD OF MAKING AND MAGNETIZING ENCASED PERMANENT MAGNETS
Original Filed March 30, 1948     2 Sheets-Sheet 2
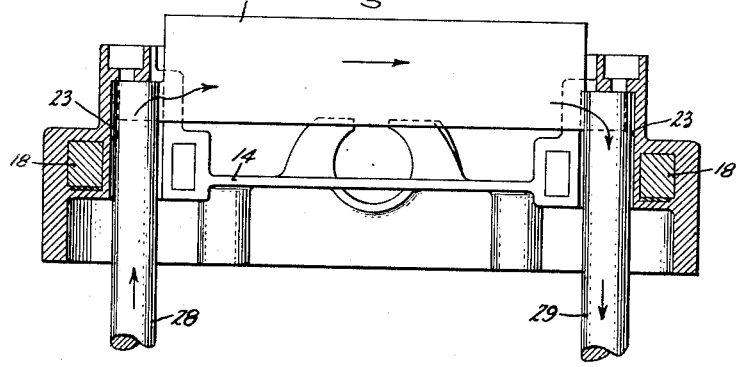
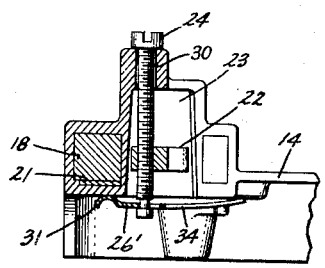
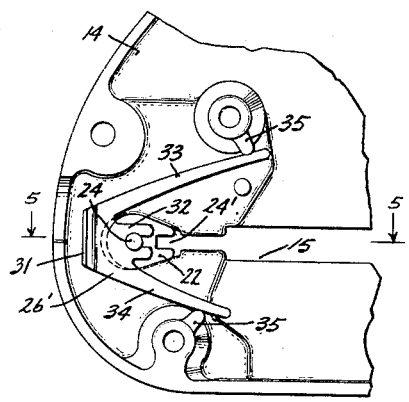
Inventors:
James H. Goss,
Lewis I. Mendelsohn,
Hans A. Bakke,
by Prowell S. Mack
Their Attorney.

Patented July 20, 1954

2,683,921

UNITED STATES PATENT OFFICE 2,683,921

METHOD OF MAKING AND MAGNETIZING ENCASED PERMANENT MAGNETS

James H. Goss, Schenectady, N. Y., and Lewis I. Mendelsohn, Lynn, and Hans A. Bakke, Swampscott, Mass., assignors to General Electric Company, a corporation of New York Original application March 30, 1948, Serial No. 17,884, now Patent No. 2,668,275, dated February 2, 1954. Divided and this application May 6, 1950, Serial No. 160,476

2 Claims. (Cl. 29—155.59)

This is a division of our application Serial No. 17,884, filed March 30, 1948, now Patent 2,668,275, issued February 2, 1954, entitled, "Unitary Integrating Meter & Damping Magnet Structure."

Our parent application relates primarily to a novel supporting arrangement for the drag magnets of integrating meters and their assembly relative to other associated parts of such meters, wherein relatively small but powerful damping magnets are embedded by die-casting in a nonmagnetic conducting material comprising the meter frame.

This divisional application relates to a novel method of treating, embedding, and magnetizing the permanent magnets, with the object that their desirable properties will not be impaired by the heating incident to embedding them in the diecast material, or prevent their proper magnetization after the embedding operation.

Another divisional application Serial No. 160,- 475, filed May 6, 1950, now Patent 2,595,244, issued May 6, 1952, relates primarily to temperature compensation and effective damping strength adjustment of such embedded permanent magnets.

In carrying our invention into effect, we make use of permanent magnet material of exceptionally high external energy and residual force, so that such magnets may be made sufficiently small and light as to be cast as an integral part of the die-cast meter frame which supports the driving magnets and meter bearings. Permanent magnets suitable for our purposes may be made as described in United States Patent No. 2,295,082. Such permanent magnets have the maximum value of BH or available energy yet obtained in commercially available magnets.

An important factor in the preparation of such a permanent magnet is a heat treatment during which the magnet is cooled through the Curie point, where it undergoes a change relative to crystal structure, while being subjected to a magnetic field traversing the magnet in the same axis or direction which the final permanent magnet flux is to take. This gives the material a magnetic or anisotropic direction aligning effect and superior permanent magnetic properties. Subsequent to such treatment, the magnet is permanently magnetized in the usual way. In order to embed such a magnet in die-cast material, it must also be heated to a temperature approximately as high as the melting temperature of the die-cast material used, and the final polarization of the magnet should occur subsequent to such heating.

A preferred procedure is, first, to make the magnets magnetically anisotropic along the desired axis by heat treatment in a magnetic field while cooling through the Curie point such as described in published literature and in above noted United States patent. This treatment is followed by aging treatments in the region of 600° C.; thereafter, the magnets must not again be heated to such temperatures if destruction of magnetic properties is to be avoided. Should the temperature approach the Curie temperature, which is in the region of 800° to 900° C., not only are the coercive properties of the magnet material destroyed, but also the anisotropic properties are destroyed. The magnets are then die-cast into a suitable die-cast material having a melting point well below the Curie point temperature. A die-cast material suitable for our purposes is an alloy of 11 to 13 per cent silicon and the remainder aluminum, and has a melting point of about 580° C. Other die-cast material may be used. The actual heating of the permanent magnets in such die-casting operation is for a relatively short time period, and the actual magnet temperature is below the previous aging temperatures so that the previously obtained magnetic properties are preserved. The magnets are subsequently magnetized while embedded in the hardened die-cast material in a manner which will be explained.

One precaution which it is necessary to take in connection with such polarized permanent magnets is to avoid accidental contact with other magnetic materials. For instance, if the magnet be touched with an ordinary steel screw driver, the latter short-circuits that portion of the magnet with which it comes in contact, and the magnet is appreciably reduced in strength. Our magnets being embedded in nonmagnetic die-cast material prior to final polarization are thus protected from this danger.

Although our permanent magnets are positioned quite close to the meter driving magnets to reduce side thrust in the manner explained in Kinnard Patent No. 2,272,748, they are nevertheless fully protected against demagnetization by current surges which may occur in the driving meter coils and conductors by reason of being surrounded with the die-cast material which is good conducting material and thus damps out flux surges. Our permanent magnets, are furthermore, made C-shaped with poles of permanent magnet material on opposite sides of the meter disk, so as to avoid changes in damping strength occurring due to variations of the position of the disk across the damping flux gap. Our damping magnets are further positioned and arranged symmetrically to the driving force eddy currents in the meter disk so as to reduce vibrations set up by interaction between such eddy currents and damping flux as taught in Trekell Patent No. 2,316,638.

Although our damping magnets are substantially fully encased in a die-cast, nonmagnetic meter frame and fixed in position, provision is made both for temperature compensating shunts therefor and for varying the effective damping magnet strength for meter calibration purposes. The amount of magnetic material employed in our damping magnet system as used in a watthour meter is less than one-fourth of that usually employed in present commercial watthour meters. Besides this, we eliminate all bracket supporting and position adjusting structure for the drag magnet system of such commercial meters.

The features of our invention which are believed to be novel and patentable will be pointed out in the claims appended hereto. For a better understanding of our invention, reference is made in the following description to the accompanying drawing in which Fig. 1 is a front view of a watthour meter, certain parts being in section, incorporating our invention. Fig. 2 is a rear view of a portion of the meter die-cast frame showing the location of the drag magnets. Fig. 3 is a sectional bottom view of portions of the meter showing the location of one of the drag magnets relative to the shaft and armature. Fig. 4 is explanatory of the polarization of the drag magnets when assembled in the meter frame. Figs. 5 and 6 are sectional and end views of a preferred load adjusting shunt arrangement for one of the drag magnets.

Referring to the drawings, 1 represents the case, 2 the glass front cover, and 3 the terminal chamber cover of a single phase alternating current watthour meter. A disk 4 of conducting material is mounted for rotation with a shaft 5 supported in upper and lower bearings at 6 and 7. The shaft 5 is geared to and drives a register having a plurality of pointers 8 located at the upper front of the meter. The disk 4 is driven by fluxes from a voltage electromagnet located above the disk and a current electromagnet located below the disk. In the type of meter shown, the voltage electromagnet has an E-shaped core 9 with the open side of the E facing the disk and with a voltage coil 10 on the center core leg. The current electromagnet has a U-shaped core 11 with its open end facing the disk with current coils 12 on both legs. The voltage and current core structures are joined by side magnet yoke portions 13 which extend outside the periphery of the disk 4. As usual, the magnetic core structure is secured to the back side of a meter framework 14 having a slit 15 to accommodate the meter disk 4. The meter bearings are supported on the front side of such meter frame as is also the register. The frame of the register is represented at 16. The meter frame is made of nonmagnetic die-cast material and is provided with the necessary supporting bosses, posts and bolt holes for securing the meter parts thereto and for securing the meter frame in the meter casing. The coils are connected to the terminal chamber through wires and connectors, the latter being represented at 17. In general, the structure thus far described conforms to existing meters.

Usually the meter frame is also provided with a projecting bracket upon which a drag magnet assembly is clamped and which is adjustable radially of the disk for the purpose of adjusting the damping or retarding force. We depart from this construction and provide relatively small, high strength damping magnets 18 cast with and embedded in the die-cast meter frame 14 and, hence, non-adjustable with respect thereto. These damping magnets are contained within relatively small pockets at 19 in die-cast material at the periphery of the meter disk 4 on about diametrically opposite sides thereof. These magnets are C-shaped so as to embrace the periphery of the disk 4 with their pole pieces facing each other with the disk intervening and with the yoke of the magnet joining the pole pieces outside the disk periphery. The yoke of these magnets has a somewhat greater cross section than have the pole pieces, the cross-sectional area tapering from the center of the yoke to the pole pieces to obtain the most efficient utilization of the permanent magnetic material used for the purpose in question. As illustrated, these magnets are encased in the die-cast material both inside and outside, except at their pole faces which face the meter disk. Thus, in the drawing, the C-shaped ring 20 on the inside of the magnets is die-cast material integral with the meter framework.

Resting flat against the back side of these magnets, as viewed in Fig. 1 (front side as viewed in Fig. 2) is a thin C-shaped section of magnetic material 21 having low permeability and having a negative temperature coefficient of permeability of the correct dimensions and characteristics to correct the meter for temperature errors. These compensators shunt a relatively small portion of the permanent magnet flux from between the pole pieces, and the amount of such flux which is shunted decreases with rise in temperature. The nature of the temperature errors which occur in induction watthour meters and compensation therefor are discussed in United States Patent to Kinnard No. 1,706,171, March 19, 1929, and although we employ the same principle, the structural arrangement of our compensation is necessarily quite different from that disclosed in the Kinnard patent. In our compensator, the shunted flux and flux in the magnet flow in opposite directions. Our C-shaped compensator 21 is made of carpenter steel, a nickel-iron alloy containing about 29 per cent nickel and is cemented to the side of the permanent magnet subsequent to the anisotropic heat treatment but before casting the magnets into the die-cast material. Each of the two drag magnets per meter unit assembly is preferably provided with the same compensation.

Also associated with one or both of the drag magnets 18 is a load adjusting device serving the purpose which in prior meters was generally accomplished by moving the entire drag magnet assembly radially relative to the meter disk to vary the damping and correctly adjust the meter speed for a given load. In our meter, the drag magnets are fixed in position and we provide for load adjustment by a magnetic shunt 22 which is contained within a tubular cavity 23 in the die-cast material which extends within the central opening in the C-shaped magnet and axially to one side thereof. The shunt 22 is made of soft iron, has a sliding fit in the tubular cavity in the die-cast material, is notched on the disk side at 24' so as not to touch the disk in any position of adjustment, and is provided with guide lips at the slot opening cooperating with guide lips machined in the die-cast material on either side of the disk gap as shown in Fig. 2 to prevent the shunt 22 from turning. Through the shunt 22 there is threaded a screw 24 having a screw driver fitting head accessible from the front of the meter and by means of which the screw may be turned with a screw driver. The screw is prevented from moving endwise in some way so that, when turned, it slides the shunt 22 into or out of the central opening in the permanent magnet.

In the arrangement shown in Figs. 2 and 3, the screw 24 has a recess groove or reduced diameter portion near the end opposite the head which projects out of the cavity 23 and passes through a hole in a brass plate 25, and is secured by a spring clip 26 entering the reduced diameter portion of the screw. The plate 25 and clip 26 are retained in place by screws 27, see Fig. 2. When the plate 25 is removed, the shunt 22 may be inserted into cavity 23 and the screw 24 threaded thereinto. When these parts are assembled as shown in Fig. 3, and at the right in Fig. 2, turning screw 24 adjusts the position of the shunt 22. While the shunt 22 is spaced from the magnet 18 by a tubular shield of the die-cast material, it will shunt flux away from the disk air gap between the poles of the permanent magnet in proportion to the extent to which the shunt is adjusted within the magnet. In maximum flux shunting position it may shunt about five per cent of the damping flux of one magnet, although not limited to this value. While such load adjusting shunt is indicated as being provided on both damping magnets in Figs. 1 and 2, it is generally necessary to provide only one of the magnets with such load shunt in order to obtain an ample range of load adjustment. The directions to turn the screw for fast and slow meter adjustments are preferably indicated by the markings cast in the frame as shown adjacent screw 24 at the right in Fig. 1.

The cavity 23 in the die-cast material for reception of the shunt 22 may be made perfectly cylindrical by machining or, if its surface remains as cast, the opening will be slightly conical or have a taper from its open to closed ends necessary for removal of the molding core part. In Figs. 2 and 3, the cavity is represented as having been reamed out perfectly cylindrically such that the shunt 22 has a good sliding fit therein at all points of adjustment. In Fig. 5, the recess 23 remains as produced by the die-casting process and has not been machined and, hence, has a taper which makes it slightly larger at the open end than at the closed end. If, therefore, the shunt 22 fits with a good sliding fit at the small end, it will be somewhat loose when at the open end of the cavity. To prevent any possible change in shunting effect when the shunt 22 is in an adjusted position where it has a loose fit in the cavity, the holding and adjusting arrangement consisting of screw 24 and spring clip 26 is arranged to urge the open end of the shunt 22 against the gap side surface of the cavity adjacent thereto or towards the right in Figs. 5 and 6 and thus prevent any variation in shunting effect due to movement of the shunt crosswise of the cavity, such as might otherwise be caused by vibration, etc. The shape of the shunt and cavity at the contacting surfaces prevents the shunt from turning as in Fig. 2, as more fully described in the other divisional applications.

Our invention permits of a very large reduction in the material, weight, and space requirements of the drag magnet system as compared to earlier meters. We find it sufficient to use permanent magnets 18 which are of the following dimensions: External diameter of magnets 18, 1⅛ inches; with a maximum cross section at the center of the yoke of ½ inch square. The dimensions of the pole faces are 1/32 by ¼ inch. The dimensions here given in relation to other meter dimensions are as represented in the drawing. These magnets have a (BH) max value of the order of 4,600,000 and a residual of the order of 12,000 gausses. The new drag magnet arrangement is intended to replace the arrangement shown in United States Faus Patent No. 2,196,898, and to represent a reduction in weight of magnetic material used in the two types of drag magnet systems of from approximately 300 to 68 grams.

After the magnets are made anisotropic, the temperature compensating shunts 21 are cemented to the one side of the magnets 18, using a high temperature, thermosetting plastic cement. The magnets are then die-cast as inserts with the frame using the die-cast material previously mentioned. The die-cast material hardens and cools very quickly, so that the magnets do not rise to the melting point of the die-cast material, which is about 580 degrees C., and do not remain at any elevated temperature for any length of time. The die-casting operation does not change the magnetic properties of the magnets at all. At this stage of manufacture, the magnets have not been polarized but merely rendered anisotropic along the desired magnetizing axis. All necessary machining operations are then performed on the die-cast frames. This includes reaming out the cavity 23 for the full load adjusting shunt, if necessary, drilling bolt and screw holes, etc. The operations are performed using a jig so that all dimensions are made exact.

The magnetization of the magnets 18 is accomplished while in the die-cast material in the manner represented in Fig. 4. Conductors 28 and 29 are inserted into the open ends of the cavities 23 and through the central openings in the pair of magnets 18 of a meter frame. Fastened between the ends of the conductors is a flat copper bar 36 thin enough to pass through the air gap slots in frame 14 and magnets 18 when the conductors 28 and 29 are inserted. One-half cycle current of a 60-cycle wave having a crest value of 25,000 amperes is then passed through the circuit 28—29—36 as represented by arrows in Fig. 4. This current flows through the magnets in opposite directions and polarizes them in the definite polarity relation represented by N and S pole designations of Fig. 1. (Where drag magnets of a different polarity arrangement are desired, the magnetizing current may be passed through the magnets in the same direction.) The magnets are then knocked down by an A.-C. field. This is a knockdown of the order of fifteen per cent. The meter is then assembled and while in operation under load a further knockdown is used, as required. This knockdown is sufficient to reduce the magnets to approximately the desired strength as measured by meter speed under rated load. The magnets have and retain a high magnetic strength available as damping flux across the air gap, and the amount of such flux available for damping may be reduced as necessary by the shunt or shunts 22.

The fact that the magnets 18 are encased in nonmagnetic conductor material is highly advantageous from several standpoints. They are protected from accidental contact with other magnetic tools or parts which might cause a short circuit of a section of the magnet, resulting in a reduction in magnetic strength. The die-cast material prevents the magnets from collecting magnetic dust, such as iron filings, tool shavings, etc., except at the air gap, and it is much easier to keep them clean and to prevent such material from being carried on the magnets into the finished meter. For protection until the meter disk is installed, wooden or other nonmagnetic material wedges may be inserted into the magnet air gaps, since this is the only point of the magnets not covered by the die-cast material. However, we may provide a thin die-casting wall over pole faces also. When assembled in an operative meter, the die-cast material of the frame comes between the magnets and the coils of the meter and is effective in preventing demagnetization of the magnets by surge currents that may accidentally occur in the meter coils during operation due to short circuits, lightning, etc.

The drag magnets are fixed in position with respect to all remaining stationary parts of the meter by the meter framework and, hence, no accidental variation of the position of the drag magnet gaps can occur with respect to the driving magnet pole faces, meter bearings, etc. This is a desirable condition. It makes it possible to remove the meter disk and shaft and replace it with minimum risk of changing the meter calibration, and makes it more feasible to employ magnetic bearing suspension for the shaft 5. The bearings at 6 in our meter may and preferably will be of the magnetic suspension type described in United States Patent No. 2,311,382 to Hansen, Jr., and will support the entire weight of the rotating element. The supports for these bearings are cast integral with the frame. It will be noted that the damping magnets are symmetrically placed with respect to a center line between the axis of rotation and the center of the driving magnet system, that a line drawn between the centers of the damping magnets passes on the driving magnet side of the shaft 5, and that the damping magnets are fairly close to the driving magnet. This arrangement is beneficial in reducing side thrust on the meter disk and shaft, as explained in United States Patent to Kinnard No. 2,272,748, February 10, 1942. It will also be noted from the polarity arrangement of the damping magnets represented in Fig. 1 that the damping fluxes pass through the disk 4 in the same direction on both sides of the shaft, and that such damping fluxes are equally distant from and symmetrically positioned relative to the shaft. This arrangement is beneficial in reducing disk vibration due to interaction between the damping flux and disk eddy currents produced by the voltage fluxes, as explained in connection with Fig. 3 of United States Patent to Trekell No. 2,316,638, April 13, 1943.

In using our invention in meters having two or more driving magnet systems, the extra systems will preferably have their own die-cast frame section including the embedded damping magnets described.

In accordance with the provision of the Patent Statutes we have described the principle of operation of our invention, together with the apparatus which we now consider to represent the best embodiment thereof, but we desire to have it understood that the apparatus shown is only illustrative and that the invention may be carried out by other means.

What we claim as new and desire to secure by Letters Patent of the United States is:

1. The method of manufacturing integral meter frame and drag magnet structure which consists in selecting suitable permanent magnetic material in C-shaped form, casting the meter frame using a nonmagnetic die-cast material with the permanent magnetic material embedded therein and with an opening in the frame in alignment with the central opening in the C-shaped permanent magnet material, and subsequently permanently magnetizing the permanent magnet material by passing current through a conductor inserted through said aligned openings.

2. The method of manufacturing integral meter frame and drag magnet structure which consists in selecting suitable permanent magnet material of the desired drag magnet size and shape, rendering said material magnetically anisotropic along the desired magnetic axis, aging said material by heat treatment at about 600 degrees centigrade, then casting the meter frame with the permanent magnet material embedded therein using a nonmagnetic die-cast alloy of aluminum and silicon having a melting point of about 580 degrees centigrade and a casting time and temperature cycle during which the temperature of the magnetic material does not reach 600 degrees centigrade which does not change the magnetic properties of the permanent magnet material, and thereafter when cool permanently magnetizing the permanent magnet material along the anisotropic axis.

References Cited in the file of this patent

UNITED STATES PATENTS

| Number | Name | Date |
|---|---|---|
| 590,653 | Thomson | Sept. 28, 1897 |
| 2,168,290 | Green | Aug. 1, 1939 |
| 2,188,091 | Baermann | Jan. 23, 1940 |
| 2,209,236 | Rowell | July 23, 1940 |
| 2,258,681 | Hoglund | Oct. 14, 1941 |
| 2,272,748 | Kinnard | Feb. 10, 1942 |
| 2,284,893 | Barnes | June 2, 1942 |
| 2,295,082 | Jonas | Sept. 8, 1942 |
| 2,383,332 | Miller | Aug. 21, 1945 |
| 2,398,018 | Linley et al. | Apr. 9, 1946 |
| 2,595,244 | Goss et al. | May 6, 1952 |

FOREIGN PATENTS

| Number | Country | Date |
|---|---|---|
| 498,714 | Great Britain | Jan. 12, 1939 |